United States Patent

Muryoi

[11] 4,114,984
[45] Sep. 19, 1978

[54] ZOOM LENS BARREL CAPABLE OF MACRO-PHOTOGRAPHY

[75] Inventor: Takeshi Muryoi, Chigasaki, Japan

[73] Assignee: Nippon Kogaku K.K., Tokyo, Japan

[21] Appl. No.: 739,307

[22] Filed: Nov. 5, 1976

[30] Foreign Application Priority Data

Nov. 7, 1975 [JP] Japan .................. 50-150721[U]

[51] Int. Cl.² ............................................. G02B 15/00
[52] U.S. Cl. ..................................... 350/187; 350/184
[58] Field of Search ............................... 350/184, 187

[56] References Cited

U.S. PATENT DOCUMENTS

| 3,731,987 | 5/1973 | Iida ............................. 350/187 |
| 3,817,600 | 6/1974 | Watanabe ..................... 350/187 |
| 3,877,793 | 4/1975 | Nakagawa ................... 350/187 |

FOREIGN PATENT DOCUMENTS 4,633,495   10/1971   Japan ............................ 350/187

*Primary Examiner*—Stephen C. Bentley
*Assistant Examiner*—Donald P. Walsh
*Attorney, Agent, or Firm*—Fitzpatrick, Cella, Harper & Scinto

[57] ABSTRACT

The disclosure describes a zoom lens barrel capable of macro-photography on which a special switch ring is provided. The switch ring is externally operable and has a cam slot comprising zooming portion and macro portion.

The zoom portion is shaped to allow either of a compensator lens group or a variator lens group to move toward the direction of the optical axis of lens whereas the macro portion is so shaped not to allow it. Upon the rotation of the switch ring, a direct switchover from zooming portion to macro portion is made so as to permit macro-photography at any desired focal length.

4 Claims, 6 Drawing Figures

ZOOM LENS BARREL CAPABLE OF MACRO-PHOTOGRAPHY

BACKGROUND OF THE INVENTION

1. Field of the Invention

The present invention relates to a zoom lens barrel capable of macro-photography (that is, closed-up photography).

2. Description of the Prior Art

There are known two types of zoom lens barrels. One is a lens barrel in which focusing and zooming can be made by a single and same operating member. Another is that which has two separate members for focusing and zooming.

In view of operative features, the former is preferable to the latter. However, as the former type of zoom lens barrel, at the present, there are available only those which permit macro-photography solely at the maximum focal length (generally referred as "tele-side").

In zoom lens barrels which are hitherto known and permit macro-photography at any desired focal length, focusing and zooming should be performed by using two separate operating members.

SUMMARY OF THE INVENTION

Accordingly, it is a general object of this invention to provide a novel zoom lens having a single and same operating member for both focusing and zooming by which macro-photography can be done at any desired focal length.

Other and further objects, features and advantages of the invention will appear more fully from the following description.

Generally speaking, a zoom lens is composed of four lens groups, namely, a focusing lens group, a variator lens group, a compensator lens group and a relay lens group. These lens groups are arranged in series in the lens barrel with the focusing lens group being the foremost one, viewed from the front end side of the barrel.

For focusing at the time of conventional photography, the focusing lens group is moved and, for zooming, the variator- and compensator lens groups are moved. For macro-photography, either of the variator lens group or the compensator lens group is moved. This is a conventional procedure.

According to the present invention, a switch ring is mounted on the lens barrel in an externally operable manner. On the switch ring, there is provided a cam slot the cam follower of which is formed on either of the variator lens group or the compensator lens group. The cam slot comprises a zooming portion and a macro portion. The zoom portion is a part of the cam slot where either of the above said two lens groups is allowed to move toward the direction of the optical axis. The macro portion is a part where such movement is not allowed. When the switch ring is rotated, a direct transition from the zooming portion to the macro portion is made. Thereby macro-photography at any desired focal length is allowable.

BRIEF DESCRIPTION OF THE DRAWING

FIGS. 1-4 show a first embodiment of the present invention, in which:

FIG. 1 is a longitudinal sectional view of a zoom lens barrel emboding the invention;

FIG. 2 is an exploded detail view of the cam used in the lens barrel of FIG. 1, with its position being at the minimum focal length;

FIG. 3 is a view similar to FIG. 2 but showing the cam at the medium focal length position;

FIG. 4 is a view similar to FIG. 2 but showing the cam at the maximum focal length;

DESCRIPTION OF THE PREFERRED EMBODIMENTS

Figure 1:
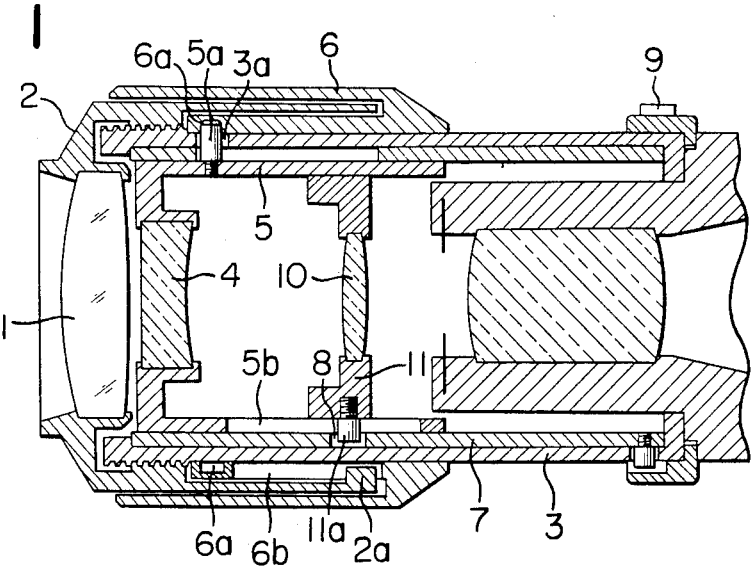

The first embodiment of the present invention is illustrated in FIGS. 1-4. Referring first to FIG. 1, there is shown, in longitudinal section, a lens barrel in the position where it focuses in infinity at its minimum focusing length. A front lens, that is, a focusing lens 1 is supported in the barrel by a focusing ring 2 engaged through a hericoid with a stationary ring 3 having a cam slot 3a formed thereon. A variator lens 4 in the lens barrel is supported by a variator 5 having a pin 5a and a longitudinal slot 5b. The pin 5a is engaged in the cam slot 3a of the stationary ring 3 and the slot 5b extends parallel to the optical axis of lens. The lens barrel further comprises an operating ring 6 which is externally operable and movable slidingly as well as rotationaly. On the operating ring 6, there are formed a circumferential slot 6a engageable with the pin 5a and a longitudinal slot 6b extending parallel to the optical axis and engageable with a projection 2a formed on the focusing ring 2. When the operating ring 6 is slidingly moved, the circumferential slot 6a is engaged with the pin 5a of the variator ring 5 to move the variator lens 4. On the other hand, the rotational motion of the operating ring 6 causes the focusing ring 2 to rotate through a pin-slot engagement between the projection 2a formed on the ring 2 and the longitudinal slot 6b so as to move the focusing lens 1.

Fitted to the stationary ring 3, there is a switch ring 7 having a cam slot 8. The switch ring is normally locked to the stationary ring 3, but it can be released from the stationary ring 3 for rotation by pressing down an externally operable switch key 9.

A positive compensator lens 10 in the lens barrel is supported by a compensator ring 11 having pin 11a engaged in both the longitudinal slot 5b of the variator ring 5 and the cam slot 8 of the switch ring 7.

Figure 2:
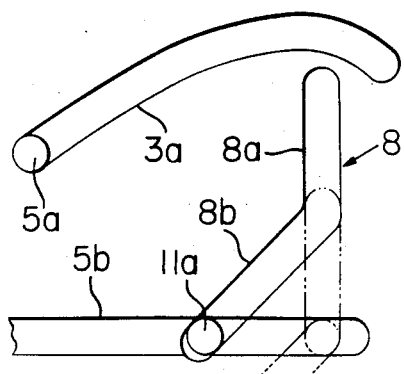
Figure 3:
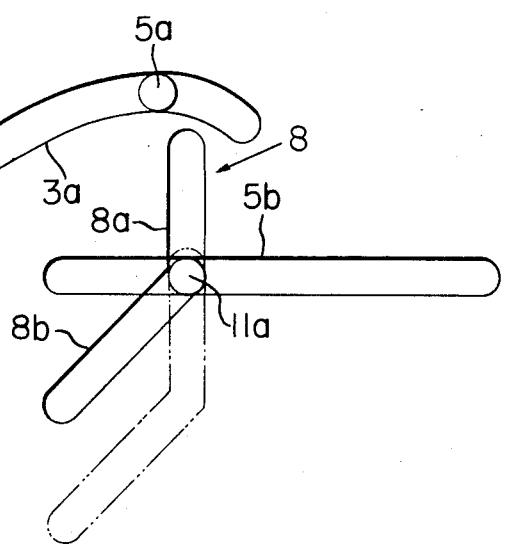
Figure 4:
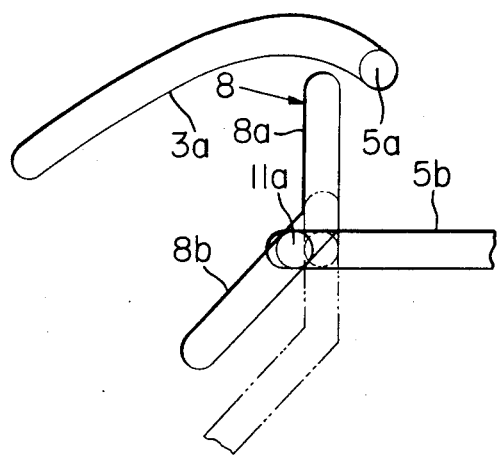

FIGS. 2-4 clearly show the above-mentioned cam slot 3a, cam slot 8 and longitudinal slot 5b. The direction of the optical axis of the lens corresponds to that of the abscissa in the drawings. FIG. 2 shows those slots in the same position as that in FIG. 1, namely in the minimum focal length position, hereafter mentioned as "wide-side." FIG. 4 shows the slots in the maximum focal length position, hereafter mentioned as "tele-side."

As seen from FIG. 2, the cam slot 3a formed on the stationary ring 3 is shaped to curve rightward upwardly first and then rightward downwardly at its portion in the vicinity of the tele-side. The cam slot 8 formed on the switch ring 7 comprises first portion 8a extending normal to the optical axis, hereafter mentioned as "macro portion" and second portion 8b extending rightward up, hereafter mentioned as "zooming portion."

The manner of operation of the lens barrel shown in FIGS. 1-4 is as follows:

Starting from the position shown in FIG. 1, if the operating ring 6 is rotated, the focusing ring 2 is advanced forward, namely toward the left-hand side viewed on the plane of the drawing through its helicoidal engagement with the stationary ring 3 so that focusing can be accomplished.

For zooming, the operating ring 6 is slidingly moved (the position shown in FIG. 1 permits the slide motion only rightward viewed on the drawing), so that the variator ring 5 moves backward (right hand side on FIG. 1) and simultaneously rotates following the cam slot 3a of the stationary ring as shown in FIG. 2. Accordingly, the longitudinal slot 5b is moved upward at an oblique angle to move the pin 11a of the compensator ring 11 upwardly - and rightward. As a result, the compensator lens 10 is retracted (toward the right hand side on the drawing) together with the variator lens 4. It will be appreciated from FIG. 3 that when the rotational movement of the variator ring 5 has reached its utmost, the pin 11a of the compensator ring 11 comes at the joint point of the zooming portion 8b and the macro portion 8a of the cam slot 8 formed on the switch ring 7.

A further backward movement of the operating ring 6 acts on the variator ring 5 in such manner that the rotational angle of the ring 5 relative to its starting position becomes smaller again and the longitudinal slot 5b pushes down the pin 11a engaged therein (see FIG. 4). As a result, the compensator lens 10 is very slightly moved forward this time opposed to its movement in the previous step. The pin 11a is now positioned within the zooming portion 8b of the cam slot 8.

In order to prepare the lens barrel for macro-photography, the operator pushes the switch key 9 down. This makes the switch ring 7 rotatable in the known manner. While keeping the key 9 pushed down, operator then rotates the switch ring 7 until it is urged to move the cam slot 8 downward from the position indicated by a solid line in FIGS. 2-4 to a position suggested by a phantom line. At the time when the cam slot 8 is brought into the position suggested by the phantom line, the pin 11a in the zooming portion 8b as shown in FIG. 2 is moved to the right on the plane of the drawing following the longitudinal slot 5b and comes into the macro portion 8a of the cam slot 8. This position of the pin 11a also is suggested by a phantom line in FIG. 2.

At the position of the pin 11a as shown in FIG. 3, it does not move any further. Upon the completion of the rotational movement of the switch ring 7, said pin 11a lies in the upper end of the macro portion 8a of the cam slot 8.

At the position of the pin 11a as shown in FIG. 4, it is moved at first to the right on the plane of the drawing in the same manner as in case of FIG. 2. After the pin 11a has reached the macro portion 8a of the cam slot 8, it remains unmoved in the position like that of FIG. 3. Upon the completion of the rotational movement of the switch ring 7, the pin 11a is in the middle of the macro portion 8a as suggested by a phantom line in FIG. 4. By releasing the switch key 9, the switch ring 7 can be locked in this position in the known manner.

A focusing for macro-photography can be made by sliding the operating ring 6 in the same manner as in case of zooming. At this time, the longitudinal slot 5b is moved up and down obliquely, but the compensator lens 10 is never subjected to any forward (left on the drawing) or backward (right on the drawing) movement because the pin 11a remains in its position within the macro portion 8a of the cam slot 8 all the while. Only the variator lens 4 is moved and thereby a focusing for macro-photography is made.

Figure 5:
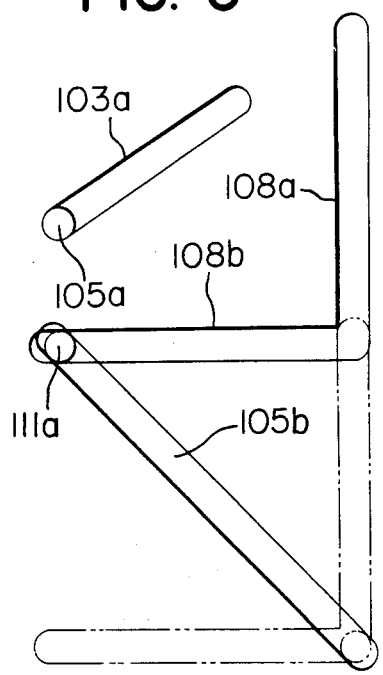
FIG. 5 is a exploded detail view of a cam showing the second embodiment of the present invention.

FIG. 5 shows the second embodiment of the present invention.

The position as shown in FIG. 5 corresponds to that of the wide side as shown in FIG. 2 regarding the first embodiment. The second embodiment differs from the first one in that a cam slot 105b extending rightwardly and downwardly replaces the longitudinal slot 5b of the variator ring shown in FIG. 2 and that a longitudinal slot 108b corresponding to the zooming portion 8b of the cam slot formed on the switch ring shown in FIG. 2 extends not angularly but parallel to the optical axis.

Starting from the position indicated by a solid line in FIG. 5, when switched to macro-photography, a pin 111a of the compensator ring is moved rightwardly and downwardly following a slot 105b in which the pin 111a is engaged. This position is suggested by a phantom line in FIG. 5.

Figure 6:
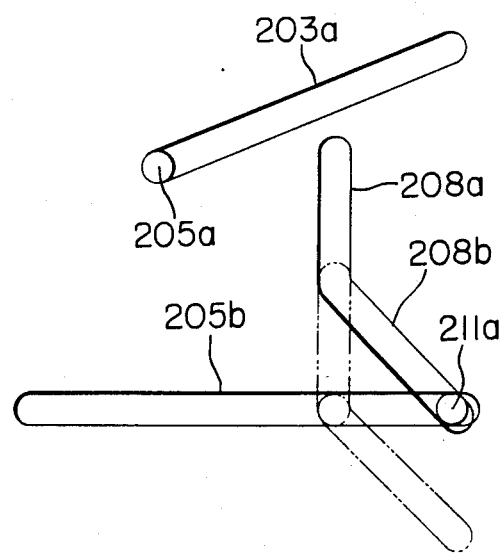
FIG. 6 is a exploded detail view of a cam showing the third embodiment of the present invention.

FIG. 6 shows the third embodiment of the present invention in which use is made of negative compensator lens.

The position as shown in FIG. 6 is that of the wide-side and the phantom line suggests a position after switching has been done for macro-photography. In case of the use of a negative compensator lens, a zooming from wide-side to tele-side should be made by moving the compensator lens mainly forward (to the left side of the drawing), opposed to the movement of it in case of the first and second embodiments. To this end, the zooming portion 208b of the cam slot formed on the switch ring is inclined leftward up. On the contrary, if the cam slot 203a of the stationary ring is formed to inclined rightward down, then the cam slot of the switch ring shall be in the form as if the cam slot shown in FIG. 6 is symmetrically rearranged with respect to the longitudinal slot 205b. In other words, the zooming portion shall be inclined leftwardly and downwardly.

From the foregoing, it will be understood that the cam slot of the switch ring may have various shapes in accordance with the shapes of the cams formed on the stationary ring and/or the variator ring.

During zooming, in the embodiments of FIGS. 5 and 6, the pins 111a and 211a of the compensator rings respectively lie in the zooming portions 108b and 208b of the cam slots on the switch rings. When switching is done for macro-photography, said pins 111a and 211a are moved into the macro portions 108a and 208a respectively and take their positions therein in accordance with those in the zooming portions 108b and 208b.

Within the scope of the present invention, it is also possible to make a lens barrel in which, at macro-photography, only the compensator lens is moved while making the variator lens immovable.

Such a modification can be made by providing the compensator ring carrying thereon a compensator lens with a cam slot and a pin interlocked with the slide motion of the operating ring, and further providing the variator ring carrying thereon a variator lens with a pin which is engaged in the cam slots of the variator ring and the switch ring.

From the foregoing, it is obvious that the present invention bestows a novel ability on a zooming lens barrel using a single and same operating ring for both focusing and zooming.

The lens barrel according to the present invention is provided with a special switch ring having a cam slot comprising a zooming portion and a macro portion. The special switch ring permits the direct switchover of the lens barrel to the position for macro-photography at any desired focal length but without losing any merit of the use of single and same operating ring. Therefore, the present invention obviates time and trouble involved in shifting the operating ring to either of tele-side and wide-side and further prevents the operator from mistaking the direction of operation. This assures rapid and accurate macro-photography.

While the present invention has been particularly shown and described with reference to preferred embodiments thereof, it will be understood by those skilled in the art that the foregoing and other changes in form and details can be made therein without departing from the spirit and scope of the invention.

What is claimed is:

1. A zoom lens barrel having a focusing lens system and a magnification lens system including first and second movable lens groups, in which zooming is effected by moving both the first and second lens groups and focusing for macro-photography is effected by moving the first movable lens group with the second movable lens group fixed at the position for the macro-photography, the zoom lens barrel comprising:

a fixed tube provided with a first cam groove;
   an operation ring mounted for rotation and sliding movement relatively to the fixed tube;
   means for moving the focusing lens system in association with the rotation of the operating ring;
   a driving cylinder holding the first movable lens group and provided rotatably and slidably with respect to the fixed tube, the driving cylinder being provided with a second cam groove;
   means for moving the driving cylinder in association with the sliding movement of the operating ring;
   a driven cylinder holding the second movable lens group and being slidably fitted on the driving cylinder;
   a switch cylinder disposed for rotation within a predetermined angle with respect to the fixed tube, the switch cylinder being provided with a third cam groove;
   a first connecting member for connecting the driving cylinder to the first cam groove;
   a second connecting member for connecting the driven cylinder to the second cam groove and the third cam groove; and
   the third cam groove including a zooming portion in which the driven cylinder is movable in the optical axial direction when the driving cylinder is rotated and a macro portion in which the movement of the driving cylinder is prevented the zooming portion being continuous to the macro portion, and the switch cylinder being operable so that the second connecting member may be located in either the zooming portion or the macro portion.

2. A zoom lens tube according to claim 1, wherein the orientation of the zooming portion of the third cam groove has an optical axial component and the orientation of the macro portion has a rotational component only, at least one of the zooming portion and the second cam groove being so formed as to provide a component for rotational direction.

3. A zoom lens system according to claim 2, wherein the first connecting member is fixed to the driving cylinder and the second connecting member is fixed to the driven cylinder.

4. A zoom lens tube according to claim 3, wherein each of the first and second connecting members is a pin.

* * * * *